July 17, 1956  J. L. STÅLHED  2,755,179
METHOD AND DEVICE FOR THE DESULPHURIZATION
OF CARBURETTER GAS
Filed Oct. 3, 1952
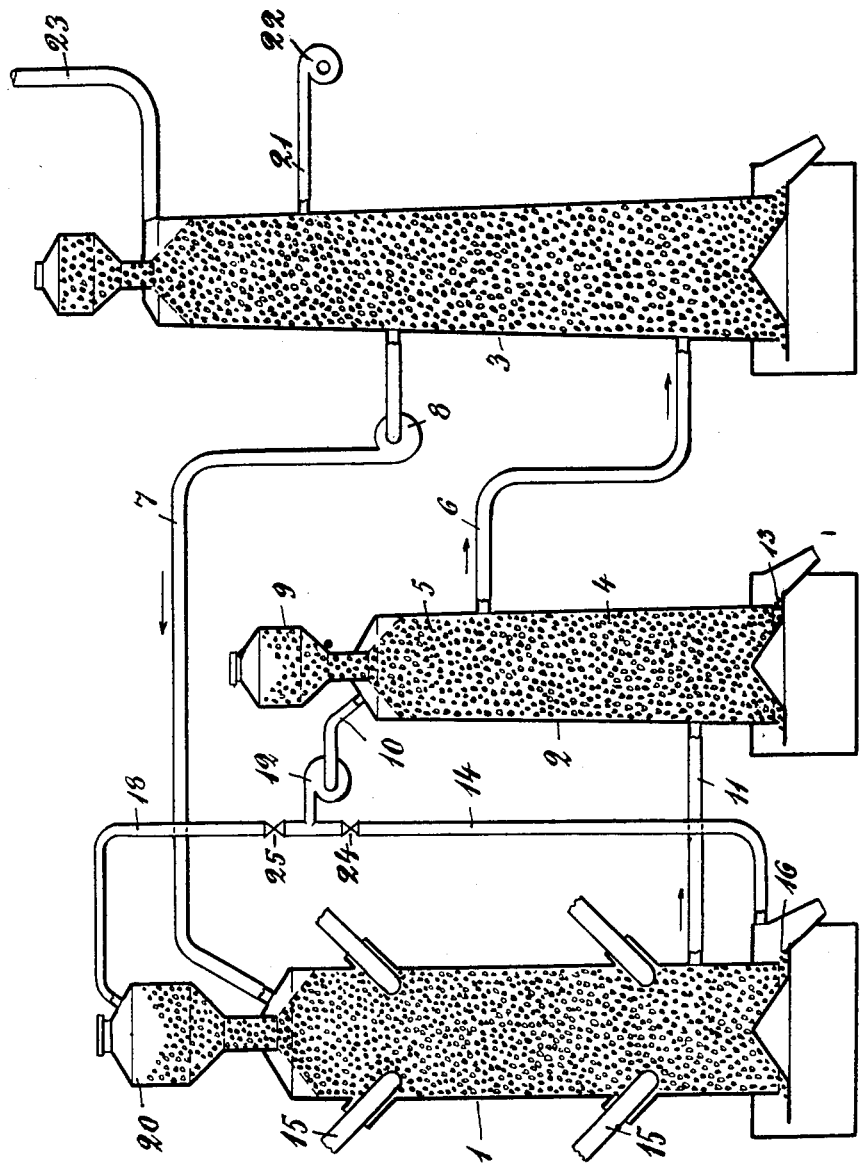
Inventor
John L. Stålhed,
By
Pierce, Scheffler & Parker
his Attorneys United States Patent Office 2,755,179
Patented July 17, 1956

2,755,179
METHOD AND DEVICE FOR THE DESULPHURIZATION OF CARBURETTER GAS

John L. Stalhed, Soderfors, Sweden, assignor to Stora Kopparbergs Bergslags Aktiebolag, Falun, Sweden Application October 3, 1952, Serial No. 312,881

Claims priority, application Sweden October 18, 1951

7 Claims. (Cl. 75—35)

The present invention relates to the production of a carburetter or producer gas and more particularly to the purification of carburetter gas, especially for the purpose of desulphurizing such gas. It is common practice in the desulphurization of carburetter gas produced from sulphuric fossil fuels, such as coals, coke, antracite and fuel oil, particularly when to be used in the process of dry reduction of oxidic ores, to pass the gas, as obtained in hot state from the carburetter, upwardly through a filter successively charged with limestone or dolomite in lumps, that is carbonates of calcium or calcium and magnesium, respectively. These carbonates become successively burnt by the physical heat content of the carburetter gas passed therethrough so that carbon dioxide and the oxides of calcium and, in case of dolomite, also of magnesium, will be formed. These oxides absorb the sulphuric matter of the gas, mainly hydrogen sulphide, and are converted to the sulphides and possibly some other sulphur-compounds of calcium and magnesium, respectively. The filter is thus subdivided in one upper decarbonating zone and a lower sulphur absorption zone. By this treatment with limestone or dolomite the temperature of the gas becomes reduced and at a consumption of about 70 kilogrammes limestone or dolomite per 1000 cubic meters of carburetter gas, calculated as of room temperature and atmospheric pressure, which is quite a normal consumption, the temperature decreases by about 150 to 200° C. This means that if a given temperature of the purified reduction gas is required the carburetter has to be run or operated at a correspondingly higher temperature than in case no desulphurization would have taken place. Another drawback is the fact that the exit gas from the desulphurization filter becomes diluted by the carbon dioxide liberated from the limestone or dolomite as a result of the burning.

One object of the present invention is, therefore, to provide a method for desulphurization of carburetter gas by such basic materials as limestone and dolomite by which the temperature of the gas will not be reduced to any material extent. It is also an object that the desulphurized gas shall not be enriched in carbon dioxide. A further object of the invention is to reduce the carbon dioxide liberated in connection with the desulphurization operation. A still further object is to utilize the carbonaceous residues contained in the cinder or ashes from the carburetter and also to cool said cinder or ashes and thereby to recover heat. It is, furthermore, an object of the invention to preheat the carbonaceous matter charged to the carburetter so as to reduce the amount of heat required for the carburetting operation or to increase the exit temperature of the gas.

For obtaining these objects and other advantages that will be obvious to those skilled in the art the present invention resides, in general, in removing from the desulphurization filter as referred to above as purified gas only the major portion of the carburetter gas introduced into the filter and remove it from the border region between the sulphur adsorption zone and the decarbonating zone, whereas the remaining minor portion of the gas is passed further through the limestone or dolomite or the like freshly charged to the decarbonating zone. Cooled by the decarbonating process and enriched in carbon dioxide thereby this minor gas portion is returned to the carburetter to a place remote from the outlet for carburetter gas, whereby the gas is utilized and the carbon dioxide will be converted to carburetter gas. This minor gas portion is preferably returned to the ash zone of the carburetter so as to become reheated by the waste material thereof and have its carbon dioxide content reduced to carbon monoxide by the carbonaceous material which normally is contained in the cinder or ashes. By this procedure not only the ashes are cooled and heat recovered but also waste carbon is recovered. The gas may alternatively or additionally be returned from the desulphurization filter to the charge of the carburetter to preheat the freshly charged material.

The invention will now be described more in detail with reference to the accompanying diagrammatic drawing illustrating the invention used in connection with the manufacture of carburetter gas for reducing iron ore for the production of sponge iron, but it is to be understood that the invention is not limited to such application.

The carburetter 1 may be constructed in any conventional manner and is here illustrated as a vertical shaft being heated electrically by current supplied through electrodes 15. The carbonaceous material to be carburetted is supplied through hopper 20 and fills up the carburetter shaft. The cinders ultimately formed are discharged from the ash zone at the bottom as indicated by reference numeral 16. The carburetter gas is taken off through pipe 11 at a point near the ash zone of the carburetter 1 and is introduced near the bottom of the desulphurization filter 2 which is subdivided into a lower portion 4 comprising a sulphur absorbing zone and an upper portion 5 comprising a decarbonating zone. The major portion of the gas introduced is removed from the border region of the portions 4 and 5 through pipe 6 and is introduced into the bottom of the sponge iron reduction furnace 3. By the aid of a ventilator 8 the gas used in the reduction process is removed from a point higher up in the furnace and is returned through pipe 7 to the upper portion of carburettor 1 to be restored. The furnace 3 is provided at the top with an inlet 21 for air blown into the furnace by the aid of a ventilator 22 and flue gas is exhausted through stack 23. The operation of the furnace constituting, however, no part of the invention detailed description thereof or of its function will not be given here.

Basic material, preferably in the form of limestone or raw dolomite but, in general, any equivalent material is introduced in the form of lumps through a hopper 9 into the desulphurization filter 2. The material charged becomes gradually burnt to form oxides in the decarbonation zone 5 and travels gradually downwards through the sulphur absorption zone 4 to be ultimately discharged through the annular opening 13 round the bottom of the filter. The major portion of the gas introduced through pipe 11 is removed through exit pipe 6 as described above. The remaining minor portion is passed through the decarbonation zone 5 upwardly, gradually liberating carbon dioxide from the material charged. Cooled and enriched in carbon dioxide this minor gas portion is sucked out from the top of the filter through pipe 10 by the aid of ventilator 12 which presses the gas either through pipe 14 to the ash zone at the bottom of carburetter 1 or through pipe 18 to the charging hopper 20 of the carburettor, or both ways, by appropriate setting of the valve 24 in pipe 14 and valve 25 in pipe 18.

What is claimed is:

1. A method for the desulphurization of a sulphur-containing producer gas rich in CO which method comprises the steps of charging at least one of the basic substances of the group consisting of limestone and raw dolomite in the form of lumps to the top of a gravitationally descending column of similar basic material so as to maintain said column of basic material, countercurrently passing a stream of sulphur-containing producer gas rich in CO, at the dissociation temperature of the carbonates of said basic materials, through at least the lower part of said column into contact with the basic material contained therein, removing the major portion of said flowing gas from said column at a level intermediate the bottom and top thereof, passing the remaining minor portion of said flowing gas further upwardly through said column to decarbonate the basic material contained therein, removing near said top of the column said remaining minor portion enriched in carbon dioxide liberated from said basic material, and carburetting said removed minor portion of gas laden with $CO_2$ by reacting the same with a material containing a carbonaceous fuel, at reaction temperature, thereby converting the $CO_2$ content of the former to CO.

2. A method for the desulphurization of a sulphur-containing producer gas rich in CO as defined in claim 1, in which the carburetting material is a waste material consisting of solid incompletely consumed sulphur-containing carbonaceous fuel and the ash of such fuel, said waste material being initially at the dissociation temperature of the carbonates of said basic materials, and in which the so-carburetted gas thereupon is mingled with said sulphur-containing producer gas rich in CO.

3. A method for the desulphurization of a sulphur-containing producer gas rich in CO as defined in claim 1, in which the carburetting material is a mass of solid sulphur-containing carbonaceous fuel and in which the gas to be carburetted is passed through said mass while at least a part of the latter is at the dissociation temperature of the carbonates of said basic materials.

4. In a cyclical process of reducing an oxide of iron to sponge iron by reactive contact of the former with a reaction gas rich in CO involving the steps of (1) continuously intimately contacting a stream of reaction gas rich in CO with such oxide of iron at elevated temperature, (2) continuously carburetting the resulting $CO_2$-laden and relatively CO-poor gas stream by reacting the same with a sulphur-containing carbonaceous fuel at reaction temperature thereby producing a stream of sulphur-containing gas poor in $CO_2$ and rich in CO, and (3) continuously desulphurizing the latter stream preparatory to using the same as the stream of reaction gas rich in CO in a repetition of the first step of the cyclical process the improvements which consist in continuously passing the stream of carburetted sulphur-containing gas poor in $CO_2$ and rich in CO through a readily gas-traversable mass of reactive oxide of the group consisting of calcium oxide and magnesium oxide at the dissociation temperature of the carbonates of said basic materials, and above the dissociation temperature of the corresponding carbonate of said reactive oxide, thereby freeing the gas so treated from sulphur compounds, continuously diverting a minor portion, only, of the resulting stream of desulphurized reaction gas rich in CO while passing the major portion of said stream to the first step of the cyclical process, continuously passing the diverted portion of the desulphurized gas stream through a mass of lumps of material of the group consisting of calcium carbonate and magnesium carbonate thereby producing a mass of reactive oxide at elevated temperature for use in the desulphurizing step and relatively cooling the so-used diverted portion of the gas stream and loading the latter with $CO_2$, and continuously returning the so-used diverted portion of the gas stream to the carburetting step of the cyclical process.

5. In the process of producing a desulphurized producer gas rich in CO involving the steps of reacting a sulphur-containing carbonaceous fuel at reaction temperature with a gas relatively poor in CO and relatively rich in $CO_2$, whereby to reduce the $CO_2$ content of the gas to CO, and treating the resulting sulphur-containing producer gas rich in CO with a reactive compound of the group consisting of alkaline earth metal oxides and magnesium oxide whereby to abstract sulphur compounds from such producer gas, the improvements which consist in effecting the desulphurization at the dissociation temperature of the carbonates of said basic materials, passing a minor portion of the so-desulphurized producer gas, at such elevated temperature, through a mass of lumps of initially substantially unheated carbonate of the group consisting of alkaline earth metal carbonates and magnesium carbonate whereby to convert said carbonate to oxide and to contaminate the so-used portion of producer gas with $CO_2$ and substantially to cool the $CO_2$-laden portion of producer gas, and passing the resulting cool $CO_2$-laden portion of producer gas into reactive contact with said fuel to convert its $CO_2$ content to CO.

6. In the process of producing a desulphurized producer gas rich in CO involving the steps of reacting a sulphur-containing carbonaceous fuel at reaction temperature with a gas poor in CO and rich in $CO_2$, whereby to reduce the $CO_2$ content of the gas to CO and convert said fuel into a mass of carbonaceous ashes, and treating the resulting sulphur-containing producer gas rich in CO with a reactive compound of the group consisting of alkaline earth metal oxides and magnesium oxide whereby to abstract sulphur compounds from such producer gas, the improvements which consist in effecting the desulphurization at the dissociation temperature of the carbonates of said basic materials, passing a minor portion of the so-desulphurized producer gas, at such elevated temperature, through a mass of lumps of initially substantially unheated carbonate of the group consisting of alkaline earth metal carbonates and magnesium carbonate whereby to convert said carbonate to oxide and to contaminate the so-used portion of producer gas with $CO_2$ and substantially to cool the $CO_2$-laden portion of producer gas, and passing the resulting relatively cool $CO_2$-laden portion of producer gas into reactive contact with said hot carbonaceous ashes to convert its $CO_2$ content to CO.

7. In the process defined in claim 4, the method consisting in withdrawing said stream of sulphur-containing gas from said fuel in the carburetting step before the carbon content of the fuel has been exhausted so as to form a mass of carbonaceous ashes, and continuously returning said diverted portion of gas to said mass of ashes.

References Cited in the file of this patent

UNITED STATES PATENTS

| | | |
|---|---|---|
| 137,713 | Patterson | Apr. 8, 1873 |
| 1,900,667 | Raffloer | Mar. 7, 1933 |
| 1,950,981 | Gludd et al. | Mar. 13, 1934 |
| 2,070,620 | Price | Feb. 16, 1937 |
| 2,557,680 | Odell | June 19, 1951 |
| 2,623,817 | Lewis | Dec. 30, 1952 |
| 2,671,722 | Sweetser et al. | Mar. 9, 1954 |

FOREIGN PATENTS

| | | |
|---|---|---|
| 515,982 | Germany | Jan. 17, 1931 |